No. 717,156. Patented Dec. 30, 1902.
E. BASEMAN & J. S. HEATH.
BEARING FOR WHEELS OF AGRICULTURAL MACHINES OR OTHER VEHICLES.
(Application filed July 7, 1902.)
(No Model.)
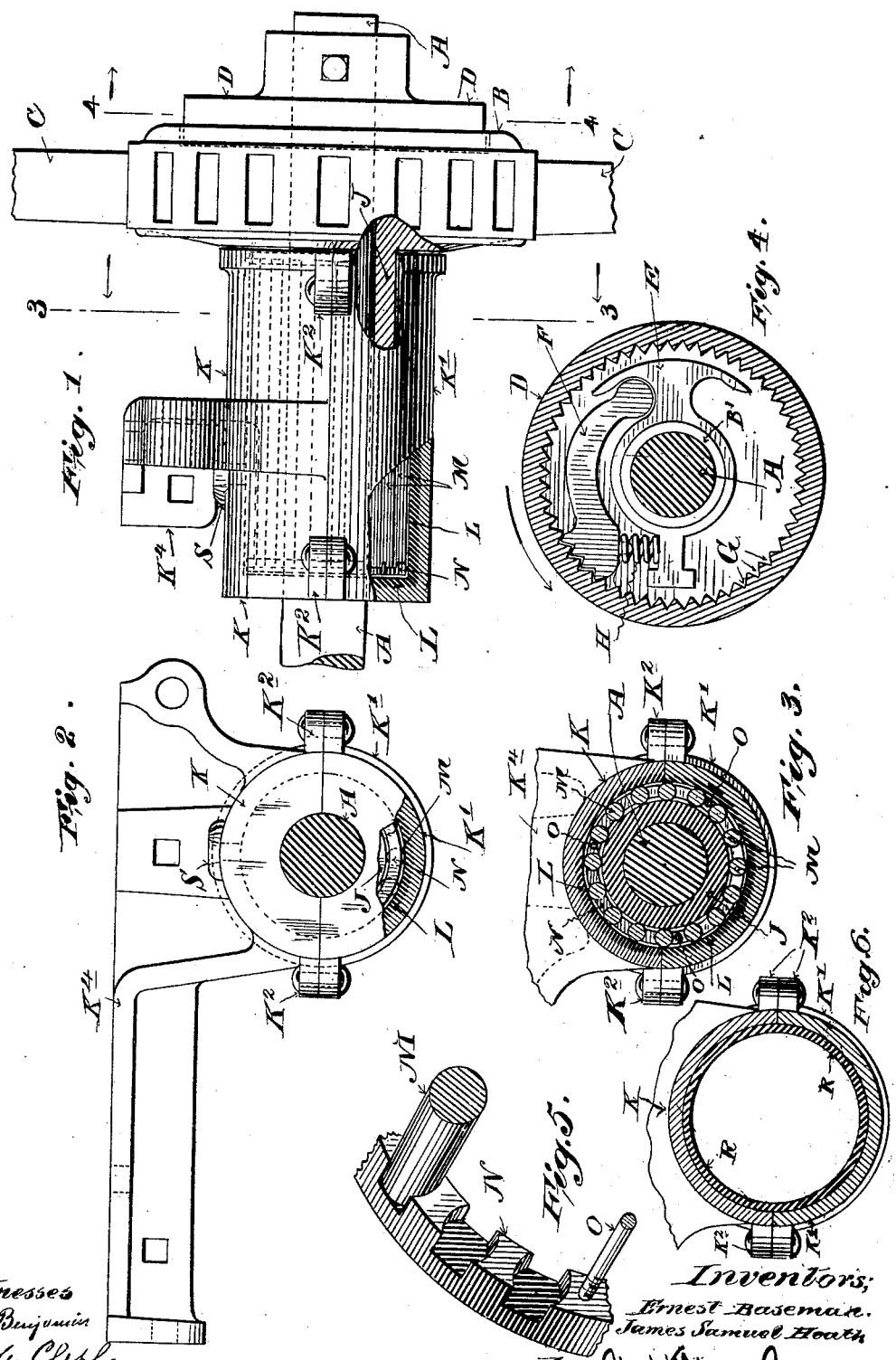

UNITED STATES PATENT OFFICE.

ERNEST BASEMAN AND JAMES SAMUEL HEATH, OF MACEDON, NEW YORK, ASSIGNORS TO BICKFORD AND HUFFMAN COMPANY, OF MACEDON, NEW YORK, A CORPORATION OF NEW YORK.

BEARING FOR WHEELS OF AGRICULTURAL MACHINES OR OTHER VEHICLES.

SPECIFICATION forming part of Letters Patent No. 717,156, dated December 30, 1902.

Application filed July 7, 1902. Serial No. 114,538. (No model.)

*To all whom it may concern:*

Be it known that we, ERNEST BASEMAN, a citizen of the United States, and JAMES SAMUEL HEATH, a British subject, both residing at Macedon, in the county of Wayne and State of New York, have invented a certain new and useful Improvement in Bearings for Wheels of Agricultural Machines or other Vehicles, of which the following is a specification.

Our invention relates to bearings for wheels, and more particularly to that class thereof employed in connection with grain-drills or other agricultural machines.

In grain-drills or seeding-machines especial precautions have to be taken and the necessary arrangements provided for insuring the accurate placing of the axle and a proper bearing therefor, as in addition to serving as an axle it constitutes the main driving-shaft of the machine from which power is imparted to the several operative parts and is thus subjected to considerable stress and pressure and is liable to wear and to be cut into and injured in such manner as to impair its efficiency and adjustment. In order to meet these requirements, a number of plans have been adopted, and among others the provision of an extended cylindrical bearing for the axle, which distributes the wear and friction arising from the weight and draft of the machine over a considerable portion of its exterior, thereby lessening the liability to displacement and the channeling or cutting into the metal. It has further been customary to make these cylindrical bearings of hard metal, such as steel, which have been formed ordinarily by boring or turning. As this machining of hard metal is an expensive and difficult operation, it has also been proposed to employ a softer metal with a locally-hardened surface, such as cast-iron with an interior chilled bearing-surface, or to employ a softer bearing provided with a separate cylindrical bearing-surface inserted therein. A difficulty has arisen in employing a cast-iron bearing with an interior chilled bearing-surface in that the rapid cooling of the metal about the chill renders it difficult to withdraw the chill, because of the consequent contraction. We propose to obviate this latter difficulty by forming the exterior bearing in two parts, which may be separately chilled and then secured firmly together, or as an alternative form of construction to employ an interior steel or other hard cylinder in connection with the two members, the independence of which insures the convenient assembling of the bearing with the other parts. With the construction described we employ a cylindrical extension from the hub of the wheel which surrounds the axle and between which and the hard bearing-surface is interposed a roller-bearing device to minimize the friction.

Our invention therefore consists in the construction and combination of parts now to be described in the specification and as finally pointed out in the claims.

In the accompanying drawings, wherein the same parts are represented by the same letters of reference throughout the several views, Figure 1 is a view of our invention partly broken away and showing its application to the axle and wheel. Fig. 2 is an end view of the bearing and axle partly broken away. Fig. 3 is a sectional view taken on the line 3 3 in Fig. 1. Fig. 4 is a sectional view taken on the line 4 4 in Fig. 1. Fig. 5 is a detail of the roller-bearing construction, and Fig. 6 is a sectional view of a modified form of bearing.

The axle A is or may be of any ordinary construction and is provided at its outer end with a hub-cap D, rigidly secured thereto. Mounted upon the axle A and in close proximity to the hub-cap D is the wheel-hub B, within which the spokes C C are inserted in the customary manner. The bearing K K' is located at the inner side of the hub B and surrounds the axle A and is provided with a bracket or hanger $K^4$, whereby it may be attached to the frame of the vehicle or machine. The box or bearing proper consists of two extended semicylindrical parts or members K and K', each provided with lugs $K^2 K^2$, whereby they may be firmly connected. The interior or bearing surfaces of the sections K K' are suitably hardened, as indicated at L L, preferably by forming them of iron which is cast about a chill, or, if desired, instead of chilling the interior surfaces a hard cylindrical bearing, such as a steel tube, may be inserted therein, as shown at R in Fig. 6. The upper member K of the box is shown as provided with an oil duct or cup S.

The hub B may be connected to the axle A through the hub-cap D in any preferred manner, so that the rotary movement of the hub B will be imparted to the axle A when the wheel is moved in its forward or operative direction, and the rearward movement of the wheel permits the free rotation of the hub B upon the axle A without turning it. The special form of clutching devices constitutes no part of our present invention, although for purposes of illustration we have shown the form of clutch illustrated in Fig. 4. The hub-cap D is interiorly serrated at G, so as to be engaged by the similarly-serrated pawl F. The pawl F is supported by the bracket E, mounted upon the projecting portion B' of the hub B, and a spring H is interposed between the pawl F and bracket E to hold the pawl F in normal engagement with the serrations G upon the hub-cap D. When the wheel and hub B are turning forwardly, the bracket E upon the hub extension B' will be moved in the direction of the arrow in Fig. 4, thereby causing the engagement of the pawl F with the teeth G and the rotation of the hub-cap D and axle A. When the wheel is moving rearwardly, the bracket E will be rotated in the direction opposite to that of the arrow, and the pawl F will be moved out of engagement with the teeth G against the pressure of the spring H, and the wheel will turn without effecting the rotation of the hub-cap D and axle A. The opposite side of the hub B is provided with an extended cylindrical projection or bearing-surface J, which surrounds the axle A and is inserted within the box or bearing K K', and between the cylindrical extension J and the hard bearing-surface L of the box K K' is inserted a series of roller-bearings M, as best shown in Figs. 2 and 3. These roller-bearings M may be of any preferred or approved form of construction and constitute in themselves no part of our invention. As shown in Fig. 5, they are arranged and supported in the circular racks N, which are held one to the other by the transverse connecting-rods O.

It will be seen that by our invention we have provided a form of bearing that insures in the highest degree the necessary requirement of rigidity, due to the extended bearing of both wheel and axle within the box, of small liability to friction and wear, due to the interposition of the roller-bearings between the hub extension and the hardened bearing-surface of the box, and of simplicity of adjustment and also of cheapness in manufacture, due to the construction of the box in separate parts.

Having thus described our invention, its construction, and mode of application, what we claim, and desire to secure by Letters Patent of the United States, is as follows:

1. The combination with the axle, the hub mounted thereon, the hub being formed with a cylindrical extension which embraces the axle, and clutching means for connecting the hub to the axle, of the box or bearing comprising two semicylindrical parts, the said parts embracing both the axle and the hub extension, together with roller-bearings interposed between the hub extension and the parts of the box or bearing.

2. The combination with the axle, the hub mounted thereon, the hub being formed with a cylindrical extension which embraces the axle, and clutching means for connecting the hub to the axle, of the box or bearing comprising two semicylindrical parts and an interior hard bearing-surface, the said parts embracing both the axle and the hub extension, together with roller-bearings interposed between the hub extension and the hard bearing-surface.

3. The combination with the axle, the hub mounted thereon, the hub being formed with a cylindrical extension which embraces the axle, and clutching means for connecting the hub to the axle, of the box or bearing comprising two semicylindrical parts, and a hard sleeve or cylinder located within the box parts, the said sleeve or cylinder embracing both the axle and the hub extension, together with roller-bearings interposed between the hub extension and the sleeve or cylinder.

In testimony whereof we have signed our names to this specification in the presence of two subscribing witnesses.

ERNEST BASEMAN.
JAMES SAMUEL HEATH.

Witnesses:
B. G. THOMAS,
FRED. P. COLLEY.